S. A. AND R. I. WOLFRUM.
AUTOMATIC WINDING DEVICE FOR PHONOGRAPHS.
APPLICATION FILED DEC. 19, 1919.
1,358,602.
Patented Nov. 9, 1920.
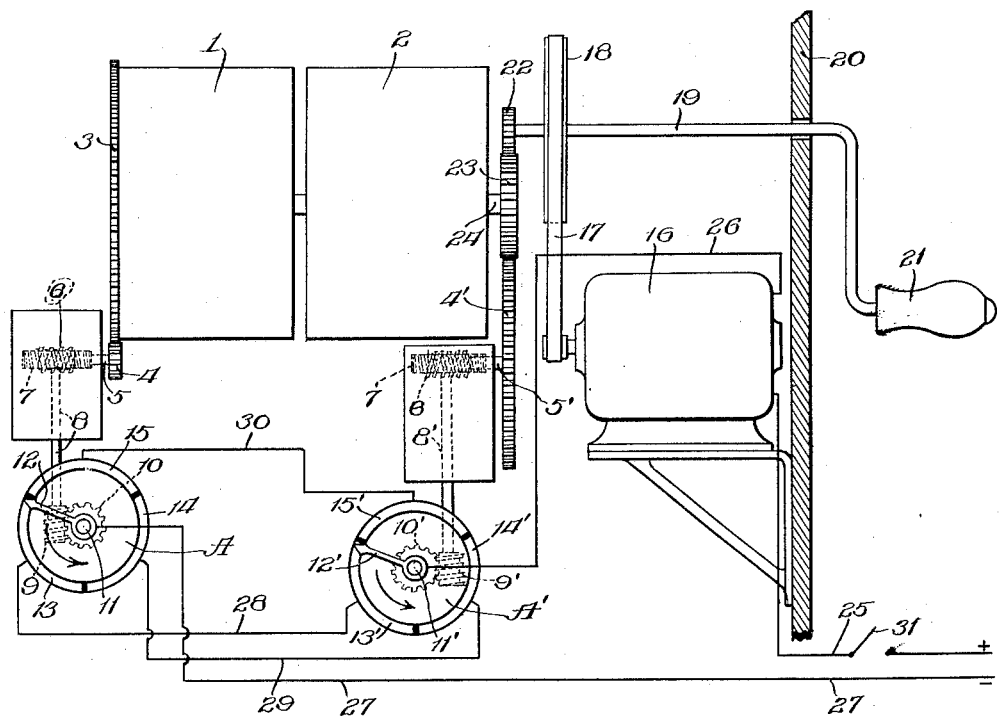
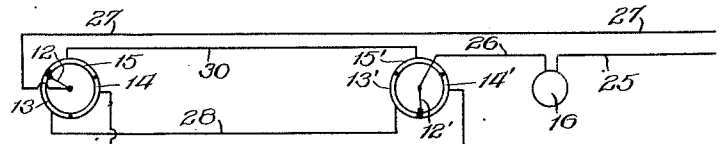
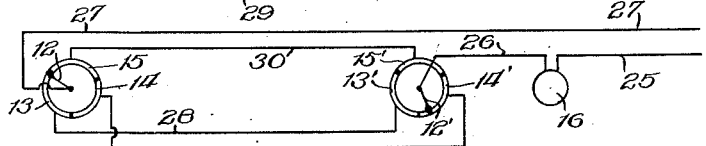
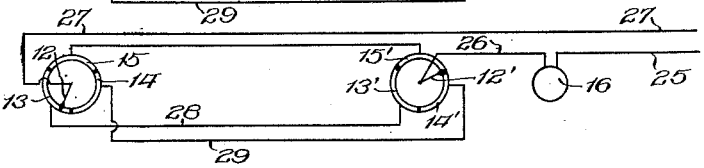
INVENTORS
S. A. Wolfrum
R. I. Wolfrum
BY
ATTORNEYS

UNITED STATES PATENT OFFICE.

STANLEY A. WOLFRUM AND RAYMOND I. WOLFRUM, OF CHICAGO, ILLINOIS.

AUTOMATIC WINDING DEVICE FOR PHONOGRAPHS.

1,358,602.　　　　　Specification of Letters Patent.　　Patented Nov. 9, 1920.

Application filed December 19, 1919.　Serial No. 345,961.

*To all whom it may concern:*

Be it known that we, STANLEY A. WOLFRUM and RAYMOND I. WOLFRUM, both citizens of the United States, and residents of the city of Chicago, in the county of Cook and State of Illinois, have invented a new and useful Improvement in Automatic Winding Devices for Phonographs, of which the following is a full, clear, and exact description.

Our invention relates to improvements in electrically operated winding devices for phonographs, and it consists in the combinations, constructions and arrangements herein described and claimed.

An object of our invention is to provide a device which may be attached to the ordinary spring driven motor for operating phonographs, by means of which the motor may be wound by an electric motor.

A further object of our invention is to provide means for stopping the action of the winding motor after a predetermined number of turns.

A further object of our invention is to provide a device of the type described in which, when the spring motor has run down, the electric motor will be automatically switched into circuit, so as to rewind the spring motor.

A further object of our invention is to provide means for winding the spring motor which will permit the use of manual means for winding the spring motor, without interfering with the automatic winding.

The invention consists essentially of an electric motor for winding the spring motor which is controlled by a pair of switches in the manner hereinafter set forth.

Our invention is illustrated in the accompanying drawings, forming part of this application, in which—

Figure 1 is a side view of the device,

Fig. 2 is a diagrammatic view showing the relative position of the two switches when the spring motor has been wound and the electric motor has stopped, Fig. 3 is a diagrammatic view showing the position of the switches when the spring motor has been further turned by hand, and Fig. 4 is a diagrammatic view showing the position of the switches when the spring motor has been turned while it is running down.

In carrying out our invention, we make use of the ordinary spring motor for operating phonographs, this motor consisting of barrels 1 and 2 inclosing the spring (not shown). The barrel 1 is provided with a gear 3 which meshes with a pinion 4 on a shaft 5, the latter driving one of the switches through any suitable means, as, for instance, the worm gearing shown. This worm gearing consists of a worm 6 in mesh with a worm wheel 7 on a shaft 8, which is provided with a worm 9 engaging a worm gear 10 on a shaft 11. The latter bears a contact arm 12 which is arranged to travel over conducting segments 13, 14 and 15.

The electric motor 16 is connected by means of any suitable driving mechanism, such as a belt 17 and a pulley 18, with a shaft 19 which projects through a casing 20 and is provided with a handle 21. The opposite end of the shaft bears a gear 22 which meshes with a gear 23 on the shaft 24 of the spring motor, so as to wind the latter when the shaft is turned. The gear 24 is in mesh with a gear 4' on a shaft 5', bearing a worm 6' in mesh with a worm wheel 7' on a shaft 8', having a worm 9' engaging a gear 10' on a shaft 11'. This shaft has a contact member 12' engaging segments 13', 14' and 15' corresponding to the segments of the companion switch. For convenience of explanation, we have designated one switch as A and the companion switch as A'. It will be noted that a lead wire 25 is connected to the motor 16 on one side. A wire 26 connects the motor with the arm 12'. A lead wire 27 is connected with the arm 12, the arms 12 and 12' being suitably insulated from their respective shafts. The segments 13 and 13' are connected by a wire 28; the segments 14 and 14' by a wire 29; and the segments 15 and 15' by a wire 30.

From the foregoing description of the various parts of the device, the operation thereof may be readily understood. When the spring motor has run entirely down, the switches are in the position shown in Fig. 1, so that when the switch 31 is closed, current will flow from the lead wire 25 through the motor 16, the conductor 26, the arm 12', the segments 13' and 13 through wire 28, the arm 12, and thence to the lead wire 27. The electric motor will be actuated to turn the spring motor to wind it up through the medium of the members 17, 18, 19, 22 and 23. The rotation of the gear 23 will drive the switch A', through the medium of the connections described, so that the hand 12' will move over the segment 13′ in a counter-clockwise direction. When the hand 12′ moves off from the segment 13′ onto the segment 14′, the motor 16 will be stopped because the current will be cut off. This condition is indicated in Fig. 2.

Now when the record is played, the spring motor will begin to run down and the barrel 1 will revolve, thus driving the arm 12 of the switch A. The switches A and A′ are alike in construction, and the device is so arranged that when the spring motor has run down both of the arms of the switches A and A′ will rest at the beginning of the segment 14, so that when the current is again turned on, the winding of the spring motor by the electric motor will occur because now both switches are on the next adjacent segments, i. e., the segments 14 and 14′, which are electrically connected together.

It is possible, however, to wind the spring motor manually by turning the handle 21. This might be done after the electric motor has been stopped because, for the sake of safety, the switching periods are arranged so that the spring will never be wound to its full tension by the electric motor, nor will it ever be entirely relaxed or unwound. Consider the first condition, shown in Fig. 3. In this figure the spring motor has been wound by the electric motor until the current has been cut off and the electric motor automatically stopped. The position of the hands 12 and 12′ will at this point be represented by Fig. 2. Suppose, however, the handle 21 is turned so as to wind the spring up to its full tension or as far as it will go, the hand 12′ will then be moved forwardly to the position shown in Fig. 3, the hand 12 remaining in the position shown in Fig. 3. The apparatus is proportioned so that this extra turning or winding of the spring will move the hand 12′ substantially an eighth of the conducting segment 14. Now when the spring motor is allowed to run, as in the playing of the record, the hand 12 will advance. As soon as it reaches the segment 14 it will bring the electric motor in the circuit and automatically rewind the spring motor. The hand 12′ will now advance and the motor will be stopped when the hand 12′ reaches the segment 15′. Now when the spring motor is allowed to run down, the hand 12 will advance over the segment 14 until it reaches the segment 15, when the two hands will again be at the same place on their respective segments. It will thus be seen that the extra winding of the spring by the handle will in no wise affect the automatic operation of the spring motor.

It may occur, however, that the operator of the phonograph will wind the spring while the record is being played, thus keeping the spring up to its full tension. This again will not interfere with the automatic winding when the motor has run down. It will be borne in mind that the hand winding can only keep the hand 12′ a segment and one eighth at most in advance of the hand 12. Consider Fig. 4. In this figure, hand 12′ has been advanced to the beginning of the segment 15′ described, and the hand 12 is moved toward the segment 14. Any further movement of the hand 12′ will bring it onto the segment 15′, so that when the hand 12 reaches the segment 14, the two hands will be out of synchronism, i. e., not on corresponding segments, and there will be no actuating of the motor to wind the spring which has been kept up to tension by the use of the handle 21. If, however, the phonograph is allowed to run down, then the hand 12 will move over the segment 14 and as far over the segment 15 as the hand 12′ has moved over the segment 15′, thus bringing the two hands into registration or synchronism, so as to permit the device to be operated automatically.

The use of two segments alone on the switch would not suffice where a handle is provided by means of which the spring may be wound further after the electric motor has ceased functioning, because if the hand 12′ is moved in advance, it might again get on the same corresponding segment with the hand 12, and thus throw current on the motor at the time the spring motor was wound. By providing an intermediate segment and limiting the additional movement which might be made by the use of the handle to bring the spring up to its full tension to a relatively small portion of the segment (we provide an eighth of a segment to bring the spring motor up to full tension, although it might be less or more than this), the current is never turned on the motor until the spring motor has run down to the point at which it is designed that the current should be turned on the spring.

This device may be easily attached to spring motors of the ordinary type of phonograph.

If for any reason the electric current should not be available, the spring motor may be wound by hand in the usual manner. The switch arm 12′ will, of course, be advanced during such winding, but when the motor runs down, the switch arm 12 will be similarly advanced so that when the current is again available, the switch arms will be in the same relative positions as if the winding had been accomplished automatically by the electric motor.

We claim:

1. The combination of a spring motor, an electric motor for winding said spring motor, a pair of switches in circuit with said electric motor for jointly controlling the latter, means connected with the electric motor for actuating one of said switches during the winding of the spring motor to cut off the current from the electric motor, and means connected with said spring motor for actuating the other switch to again turn on the current to the electric motor.

2. The combination of a spring motor, an electric motor for winding said spring motor, a pair of electric switches, each switch having a plurality of segments, and being provided with a switch arm arranged to travel over said segments, means connected with the electric motor for actuating one of said switches, means connected with the spring motor for actuating the other of said switches, and connections between the corresponding segments of the switches, said switches operating to complete the circuit to the motor when the switches are on corresponding segments, and to break the circuit of the motor when the switches are not on corresponding segments.

3. The combination of a spring motor, an electric motor for winding said spring motor, a pair of electric switches, each switch having a plurality of segments, and being provided with a switch arm arranged to travel over said segments, means connected with the electric motor for actuating one of said switches, means connected with the spring motor for actuating the other of said switches, connections between the corresponding segments of the switches, said switches operating to complete the circuit to the motor when the switch arms are on corresponding segments, and to break the circuit of the motor when the switch arms are not on corresponding segments, and means for manually winding the spring motor independently of the electric motor.

4. The combination of a spring motor, a shaft, a crank handle secured to said shaft, gearing connected with said shaft for winding the spring motor, an electric motor, means connecting the electric motor to the shaft for rotating the latter, a pair of electric switches, each of said switches having a plurality of segments and being provided with an arm arranged to travel over the segments, gearing connected with said shaft for operating the arm of one of said switches during the rotation of the shaft, gearing connected with the spring motor for operating the arm of the other switch, while the spring motor is running down, and conducting connections between the corresponding segments of said switches, said switches serving to complete the circuit through the motor when their arms are on corresponding segments, and to break the circuit of the motor when their arms are not on corresponding segments.

STANLEY A. WOLFRUM.
RAYMOND I. WOLFRUM.